United States Patent [19]

Baule et al.

[11] Patent Number: 4,849,947
[45] Date of Patent: Jul. 18, 1989

[54] ACOUSTIC GROUND VIBRATION DETECTOR

[75] Inventors: Heinrich Baule, Bochum; Manfred Borgers, Haltern, both of Fed. Rep. of Germany

[73] Assignee: Wasagchemie Sythen GmbH, Fed. Rep. of Germany

[21] Appl. No.: 54,766

[22] Filed: May 27, 1987

[30] Foreign Application Priority Data

May 27, 1986 [DE] Fed. Rep. of Germany ....... 3617847

[51] Int. Cl.$^4$ .......................... G01V 1/00; G01V 1/16; G08B 13/00
[52] U.S. Cl. ..................................... 367/178; 367/180; 367/136; 367/188; 181/112; 181/122; 340/566
[58] Field of Search ................ 181/0.5, 101, 122, 400, 181/401, 112; 367/2, 13, 14, 76, 106, 116, 129, 130, 134, 140, 153, 177, 178, 188, 191, 93, 94, 135, 136; 73/649, 654; 340/690, 566, 825.46

[56] References Cited

U.S. PATENT DOCUMENTS

| | | | |
|---|---|---|---|
| 3,615,162 | 10/1971 | Barber | 367/135 X |
| 4,151,504 | 4/1979 | Mayne et al. | 367/191 |
| 4,163,206 | 7/1979 | Hall, Jr. | 367/178 |
| 4,186,371 | 1/1979 | Toubkin et al. | 367/109 |
| 4,300,135 | 11/1981 | Horn et al. | 181/122 X |
| 4,374,378 | 2/1983 | Lee | 340/566 |

FOREIGN PATENT DOCUMENTS 2446494 9/1980 France .............................. 367/188

OTHER PUBLICATIONS

Baule, H., "Seismische Untersuchengen unter Tage", *Gluckauf*, Feb. 26, 1949, pp. 161-166.
Baule, H., "Das Bergbauhorchgerat., Ein hochempfindliches, klienes Afhorgerat fur Klopfzeichen und Gebirgsgerausche", Bergmannische Seitschrift Gluckauf, 1952, vol. 25/26, pp. 645-647.
Baule, H., "3D Unit", Jul. 1984 of the Dutch Company Sensor Nederland bv, 2251 AP Voorschoten.

*Primary Examiner*—Brian S. Steinberger
*Attorney, Agent, or Firm*—Lowe, Price, Leblanc, Becker & Shur

[57] ABSTRACT

In an acoustic ground vibration detector for the detection of infrasound ground vibrations, comprising at least one three-component geophone probe, the three individual geophones of said geophone probe are electrically connected in series and act upon an operation amplifier whose output signal activates a Reed relay. The activated Reed relay switches on a sound signal transmitter which produces an audible acoustic signal for the duration of the ground vibration signal. The acoustic ground vibration detector is intended in particular for locating buried persons. Moreover, it serves to protect important objects by registering infrasound ground vibrations produced by footfall sound.

9 Claims, 3 Drawing Sheets

ACOUSTIC GROUND VIBRATION DETECTOR

BACKGROUND OF THE INVENTION

1. Field of the Invention

This invention relates to acoustic ground vibration detectors which are used to detect vibrations in the ground and render them audible. Such ground vibration detectors are used inter alia in disaster control and rescue work, especially for detecting knocking sounds from persons buried under the surface and locating the trapped persons.

2. Description of the Prior Art

Known ground vibration detectors operate with one or more three-component geophone probes. These three-component geophone probes contain three individual geophones operating on electrodynamic principles to detect vibrations in the ground. The effective axes of vibration of the individual geophones are positioned like the three axes x, y, z of a three-dimensional, rectangular system of coordinates;see e.g. the leatlet "3D unit", July 1984 of the Dutch company Sensor Nederland bv, 2251 AP Voorschoten. This arrangement enables the three-component geophone probe to detect P-waves (primary waves or longitudinal waves), S-waves (shear waves or transverse waves) and O-waves (surface waves). These different types of waves are propagated at different velocities; the high frequency primary wave has the highest propagation velocity, the low frequency shear wave a medium velocity and the surface wave is propagated at the lowest velocity.

The geophone probes of the known ground vibration detectors are connected by a cable to an amplifier arrangement by which the signals corresponding to the ground vibrations received by the individual geophones are rendered audible, e.g. in hoadphones, and processed to locate the source of the ground vibration.

The known ground vibration detectors are, however, not entirely satisfactory as they are only able to process frequencies within the audible range, i.e. above 30 Hz or thereabouts. In some cases, it is necessary to detect ground waves at very low frequencies far below the range to which the human ear is receptive. Thus it has been found, for example, that in areas of soft ground or compacted sand or areas covered with grass or rubble or loose stone, ground vibrations at audible frequencies, say above 30 Hz, may be entirely absent, at least if these areas are at some distance from the source of the ground vibration, e.g. from a person trapped underground, but in such cases these areas still carry ground vibrations at a very low frequency which could be described as "ground infrasound".

SUMMARY OF THE INVENTION

It is an object of the present invention to provide an acoustic ground vibration detector having at least one three-component geophone probe which is capable of detecting ground vibrations and rendering them audible for location even if their frequency is below the human audibility limit.

It is a further object of this invention to provide a particularly sturdy acoustic ground vibration detector in which each three-component geophone probe is connected by a simple two-cord cable to an amplifier arrangement to render the detected ground vibrations audible.

Lastly, it is an object of the invention to provide a ground vibration detector in which the detected ground vibrations are rendered audible by simple and reliable means in that the signals corresponding to the ground vibrations actuate a sound frequency generator to produce an audible signal.

In the acoustic ground vibration detector according to the invention, the three individual geophones of each three-component geophone probe arranged along the three axes of a three-dimensional, rectangular coordinate system are electrically connected in series. This arrangement deliberately foregoes the differential reception of separate signals for each of the three axes and instead produces a mixed signal which is common to the three axes because it has been found that infrasound ground vibrations which are at a frequency below the range of the human ear can thereby be detected much more clearly than by means of individual signals.

There is also the important constructional advantage that a simple two-core cable can be used to connect the three-component geophone probe to the amplifier arrangement. This is particularly important when the geophone probes are to be laid out in chains or carpets for exact location. The signals corresponding to the infrasound ground vibrations, which are not directly audible, e.g. with a frequency of 5Hz, are readily and reliably made audible by the ground vibration detector according to the invention by means of the fact that throughout their duration these frequencies activate a sound-frequency generator by way of a high speed relay, e.g. a Reed relay, so that the sound frequency generator emits an audio signal at a fixed frequency within the hearing range of the human ear, e.g. at 2.5 KHz, which is rendered audible. The ground vibration detector according to the invention is particularly suitable for locating buried persons in difficult terrain in which relatively high frequency vibrations are only propagated over short distances, if at all. Moreover, it serves to protect important objects by registering infrasound ground vibrations produced by footfall sound; but the detector is, of course, not limited to such applications since it can also be used to detect ground vibrations of a higher frequency and render them audible.

The high-speed electronic relays used may be, for example, field effect transistor circuits, but in the embodiment of the ground vibration detector which is preferred at the present time the preferred high-speed relay used is a Reed relay because it is very simple to set up, in contrast to transistor circuits, and responds to very brief impulses, in the millisecond range.

Moreover, due to its construction, the apparatus has an accurately defined threshold voltage such that the output signal of the operation amplifier must lie above or, respectively, below this threshold so that the Reed relay will switch on or off. This operation with a threshold voltage prevents creeping or wobbling contact and eliminates any interferences in the output signal of the operation amplifier which lie below the threshold voltage. Since the individual geophones have a natural frequency below 10 Hz and preferably below 4.5 Hz, they are particularly sensitive in the required frequency range of infrasound ground vibrations, which extends right down to below 2 Hz. To suppress unwanted resonance vibrations at the natural frequency, the individual geophones may be damped by an ohmic damping resistor connected in parallel. The resistance of this resistor is calculated to make the sensitivity of the geophone as frequency-independent as possible, also in the region of its natural frequency that is, to keep the sensitivity/frequency curve as flat as possible. A filter capacitor connected in parallel with the series circuit of the three individual geophones eliminates interference signals of a higher frequency, e.g. stray radio frequencies.

If the sound frequency generator is supplied from a source of direct voltage, i.e. is connected to a direct voltage source through the Reed relay, a storage capacitor connected in parallel with the sound frequency generator may enable the sound frequency generator to continue in operation for some time after decay of the Reed relay, i.e. for longer than the duration of the particular ground vibration signal. The audibility of very brief ground vibration signals is thereby improved.

In the preferred exemplary embodiment, the sound frequency generator is a piezoelectric signal transmitter which converts a direct voltage directly into an audible signal and thus constitutes a second frequency generator and sound transmitter combined in a single unit.

BRIEF DESCRIPTION OF THE DRAWINGS

The invention together with further advantageous details thereof will now be described with reference to an exemplary embodiment schematically illustrated in the drawings, in which.

DESCRIPTION OF THE PREFERRED EMBODIMENTS

Figure 1:
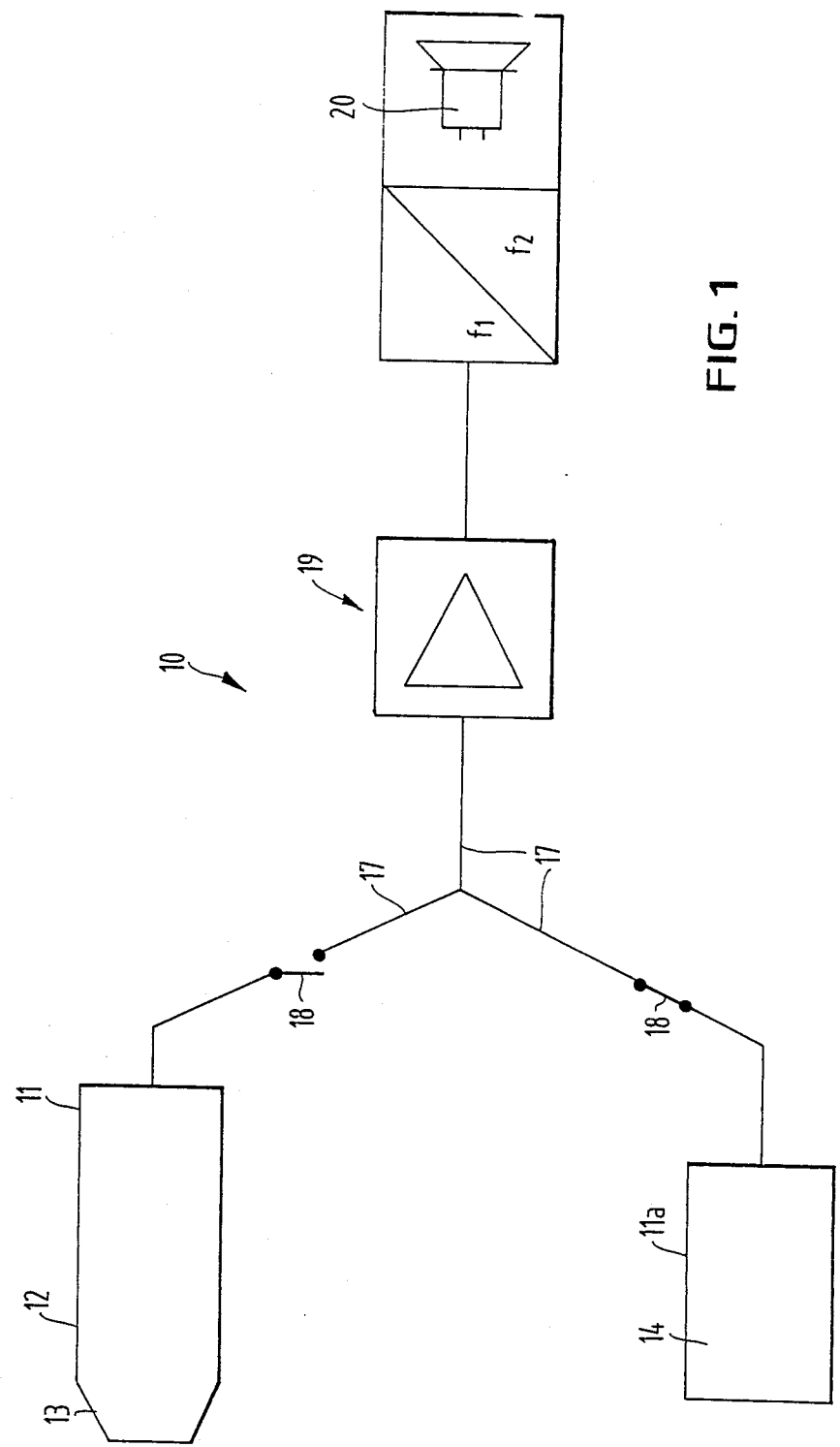
FIG. 1 is a block circuit diagram of an acoustic ground vibration detector having two different three-component geophone probes.

As shown in FIG. 1, an acoustic ground vibration detector 10 for detecting infrasound ground vibrations of a frequency down to below 2 Hz and rendering them audible comprises two vibration receivers in the form of three-component geophone probes 11 and 11a and an amplifier arrangement 19,20. The two three-component geophone probes 11 and 11a differ only in the form of their housing.

The housing of the geophone probe 11 comprises an elongated, circular cylindrical casing 12 extending into a truncated cone-shaped section 13 at the free end of the probe. By virtue of its external form, the geophone probe 11 is particularly suitable for use in boreholes into which it can be introduced with the truncated cone section 13 forwards. The housing 12, 13 contains three individual geophones $G_x$, $G_y$ and $G_z$ (not shown in FIG. 1) extending along the three axes x, y and z of a three-component dimensional rectangular coordinate system.

Figure 2:
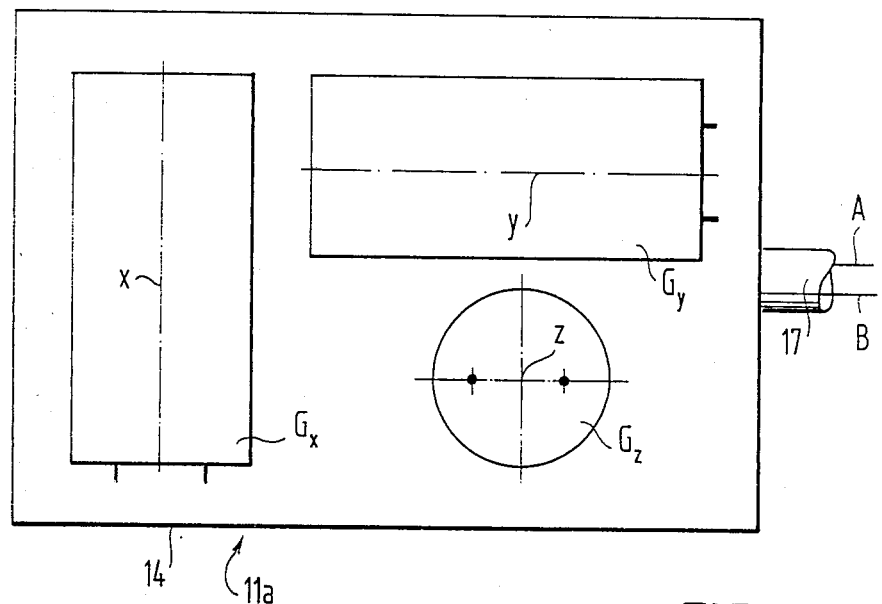
FIG. 2 shows schematically the three-dimensional arrangement of a three-component geophone probe for the ground vibration detector of FIG. 1.

The three-component geophone probe 11a has a parallelipiped or rectangular housing 14 which also contains three individual geophones $G_x$, $G_y$ and $G_z$. As shown in FIG. 2, these individual geophones are orientated along the three axes x, y and z of a three-dimensional, rectangular coordinate system so as to be placed at rightangles to the walls of the housing 14.

Figure 3:
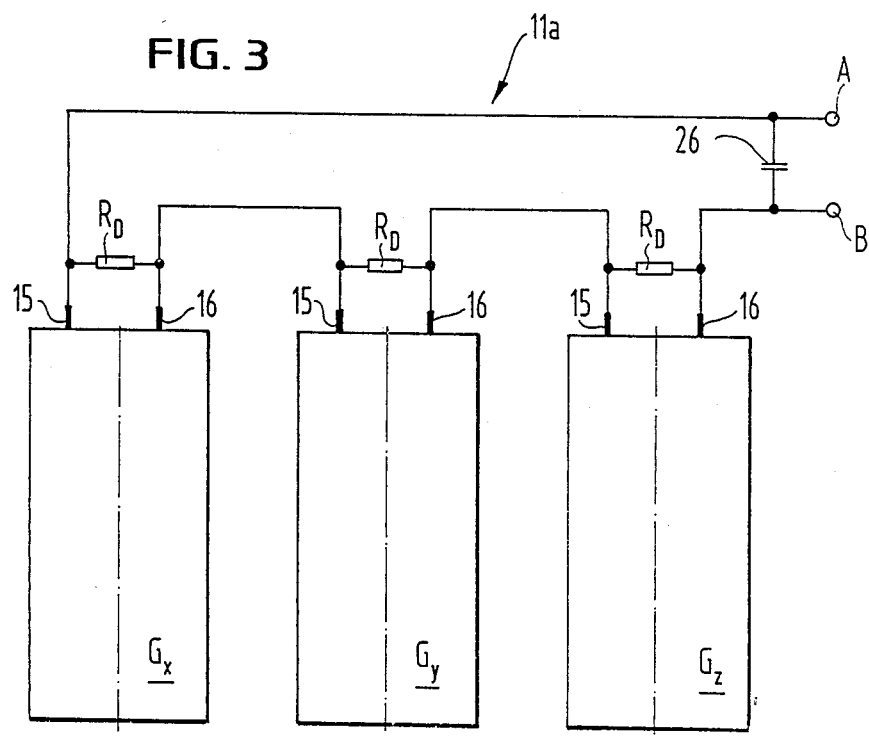
FIG. 3 is the electric circuit diagram of a three-component geophone probe for the ground vibration detector of FIG. 1.

FIG. 3 is the electronic circuit diagram of the three-component geophone probe 11a and is identical to the electric circuit diagram of the geophone probe 11. Each individual geophone $G_x$, $G_y$ and $G_z$ has two output terminals 15 and 16. The three individual geophones are electrically connected in series so that their terminals are all arranged in the same direction. Each individual geophone has a damping resistor $R_D$ connected in parallel therewith. Each individual geophone has a natural frequency of about 4.5 Hz so that the geophones are very sensitive also at the low frequency range of infrasound ground vibrations. The magnitude of resistance of the damping resistors $R_D$ is calculated on the one hand to suppress unwanted resonance vibrations and, on the other hand, to keep the sensitivity/frequency curve as flat as possible right into the region of the natural frequency. A filter capacitor 26 is connected in parallel with the whole series circuit of the three individual geophones. This filter capacitor 26 short-circuits interference signals at a higher frequency, in particular stray radio frequency signals. The two output terminals A and B of the series circuit are connected to the amplifier arrangement 19,20 by a simple, two-cord cable 17 as shown in FIG. 1. A communicator 18 connected into the cable 17 can be used to switch selectively to the cylindrical three-component geophone probe 11 or the rectangular (parallelipiped) three-component geophone probe 11a. The switch is only functionally represented in FIG. 1. Constructionally, it is best positioned at the amplifier arrangement. It can also be replaced by plugs, across which the geophone probe can alternatively be connected.

Figure 4:
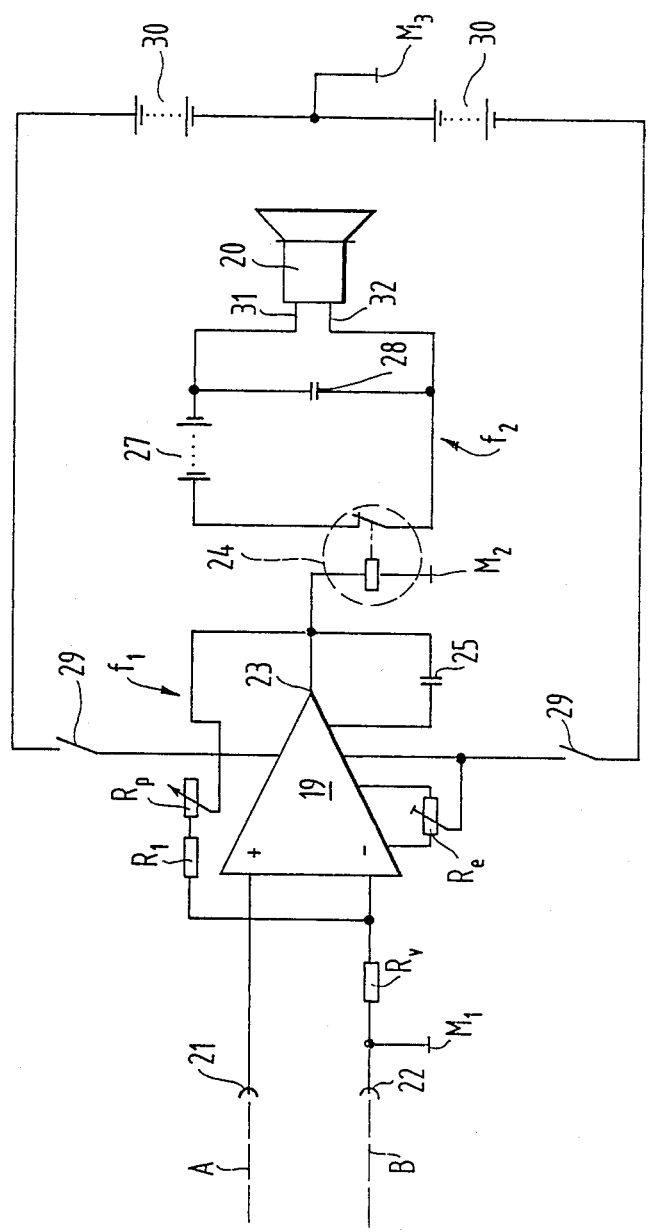
FIG. 4 is the electric circuit diagram of the amplifier arrangement of the ground vibration detector of FIG. 1.

Details of the amplier arrangement 19,20 are shown in FIG. 4. The two output terminals A and B of the series circuit of the individual geophones are connected to two input terminals 21 and 22 by the two-cord cable 17. The input terminal 22 is earthed at $M_1$ and connected to the negative input terminal of an operation amplifier 19 by a series resistor $R_V$. The input terminal 21 is directly connected to the positive input terminal of the operation amplifier 19. The output terminal 23 of the operation amplifier 19 is connected back to the negative input terminal of the operation amplifier 19 through the series circuit composed of a fixed resister $R_1$ and an adjustable resistor $R_p$. The required degree of amplification can be adjusted by means of the adjustable resistor $R_p$. The excitation coil of a Reed relay 24 is connected between the output terminal 23 and the earth point $M_2$ and is therefore actuated by the output signal of the operation amplifier 19. The Reed relay has a threshold voltage determined by its construction and amounting to about 2 V so that the relay is switched on and off, respectively, when the output voltage of the operation amplifier 19 exceeds or falls below this threshold. The output terminal 23 is in addition connected to a capacitor 25 to suppress natural high frequency vibrations of the operation amplifier 19.

The operation amplifier 19 is supplied symmetrically with current from two batteries 30 which are connected on one side to earth $M_3$ and on the other side to the operation amplifier 19 by a terminal of an On/Off switch 29. A trimming resistor $R_e$ serves to adjust the offset voltage at the output terminal 23 to zero.

The circuit arrangement $f_1$ described so far (see also FIG. 1) comprising the operation amplifier 19 which functions as direct voltage amplifier amplifies the extremely low frequency signals which are transmitted from the three-component geophone probe 11 or 11a by way of the two-cord cable 17 and correspond to the detected infrasound ground vibrations. The corresponding output signal at the output terminal 23 of the operation amplifier 19 activates the Reed relay 24 so that a normally open contact of the Reed relay 24 remains closed whenever and so long as the output signal exceeds the threshold voltage of 2 V of the Reed relay.

The normally open contact of the Reed relay 24 forms part of a circuit arrangement $f_2$ which produces an audible signal of about 2.5 KHz when the normally open contact is closed and thus indicates by its audible sound at 2.5 KHz the presence of a low frequency ground vibration signal which in itself is not audible. For this operation, the circuit arrangement $f_2$ comprises a sound frequency generator in the form of a piezoelectric signal transmitter 20 which is connected to a battery 27 by its two current supply terminals 31 and 32 by way of the normally open contact of the Reed relay 24. When the signal transmitter 20 is supplied with direct voltage from the battery 27, i.e. when the normally open contact is closed, the signal transmitter 20 directly produces an audible sound of about 2.5 KHz. A storage capacitor 28 is connected in parallel with the current supply terminals 31 and 32. This capacitor 28 charges up when the normally open contact is closed and discharges through the signal transmitter 20 when the normally open contact has opened again so that the signal transmitter 20 can continue to operate for a short time after the normally open contact of the Reed relay 24 has opened. The audibility of very brief ground vibration signals is thereby improved.

When the ground vibration detector is to be put into use, it is switched on by means of the switch 29 and one of the two three-component geophone probes 11 or 11a is selected by means of the commutator 18. The selected three-component geophone probe is introduced into a borehole or placed on the ground. Any infrasound ground vibrations, for example with a frequency in the region of 2 to 8 Hz, detected by at least one of the three individual geophones of the three-component geophone probe give rise to a signal at the input terminals 21, 22, and this signal is amplified by the operation amplifier 19. The amplified signal at the output terminal 23 of the operation amplifier 19 causes the normally open contact of the Reed relay 24 to be closed for the duration of the ground vibration signal so that a 2.5 KHz sound is produced by the signal transmitter 20, thereby rendering the ground vibration audible. The degree of amplification produced by the operation amplifier 19 is adjusted by means of the adjustable resistor $R_p$ so that in the event of any undesirable interferences, the voltage of the output signal of the amplifier 19 will remain below the threshold voltage of the Reed relay 24 and the interferences will therefore not give rise to an audible signal.

In addition, several geophone probes laid out in chains or carpets may be used for improved location.

What is claimed is:

1. Acoustic ground vibration detector having at least one three-component geophone probe which comprises three individual geophones and is connected to an amplifier for rendering audible vibration signals from the individual geophones, characterized in that the three individual geophones ($G_x$, $G_y$, $G_z$) of each of said at least one three-component geophone probe are electrically connected together in a series circuit, in that the series circuit of the three individual geophones ($G_x$, $G_y$, $G_z$) is connected to the input of an operational amplifier, in that the amplified signal at an output of the operational amplifier actuates a relay, and in that the relay, in an actuated state, switches on a sound frequency generator and wherein the three individual geophones ($G_x$, $G_y$, $G_z$) of each of said at least one three component geophone probe are arranged with their effective axes of vibration along three mutually orthogonal coordinate axes of a three dimensional rectangular coordinate system whereby reception of infrasound ground vibrations are improved by production of a mixed signal in said series circuit.

2. Acoustic ground vibration detector according to claim 1, characterized in that the relay responds only when the amplified signal is above a fixed threshold voltage.

3. Acoustic ground vibration detector according to claim 2, characterised in that the relay is a Reed relay.

4. Acoustic ground vibration detector according to claim 1, characterised in that the sound frequency generator is supplied from a source of direct voltage and a storage capacitor is connected in parallel with the sound frequency generator.

5. Acoustic ground vibration detector according to claim 1, characterised in that the sound frequency generator is formed by a piezoelectric signal transmitter.

6. Acoustic ground vibration detector according to claim 1, characterised in that a natural frequency of the individual geophones ($G_x$, $G_y$, $G_z$) is below 10 Hz.

7. Acoustic ground vibration detector according to claim 6, characterised in that a natural frequency of the individual geophones ($G_x$, $G_y$, $G_z$) is about 4.5 Hz.

8. Acoustic ground vibration detector according to claim 1, characterised in that a damping resistor ($R_D$) is connected in parallel with each individual geophone ($G_x$, $G_y$, $G_z$).

9. Acoustic ground vibration detector according to claim 1, characterized in that a filter capacitor is connected in parallel with said series circuit.

* * * * *